(12) United States Patent
Horvitz et al.

(10) Patent No.: US 9,367,815 B2
(45) Date of Patent: Jun. 14, 2016

(54) MONTE-CARLO APPROACH TO COMPUTING VALUE OF INFORMATION

(71) Applicant: Microsoft Corporation, Redmond, WA (US)

(72) Inventors: Eric J. Horvitz, Kirkland, WA (US); Semiha E. Kamar Eden, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 391 days.

(21) Appl. No.: 13/837,274

(22) Filed: Mar. 15, 2013

(65) Prior Publication Data

US 2014/0279737 A1    Sep. 18, 2014

(51) Int. Cl.
*G06N 5/00* (2006.01)
*G06N 99/00* (2010.01)

(52) U.S. Cl.
CPC .................................. *G06N 99/005* (2013.01)

(58) Field of Classification Search
CPC ........... G06N 5/04; G06N 5/02; G06N 5/048; G06Q 50/01
See application file for complete search history.

(56) References Cited

U.S. PATENT DOCUMENTS

| | | | |
|---|---|---|---|
| 2007/0124186 A1* | 5/2007 | Virine | 705/8 |
| 2011/0238614 A1* | 9/2011 | Yoon et al. | 706/52 |
| 2012/0005149 A1* | 1/2012 | Chen | G06N 5/04 706/52 |

* cited by examiner

*Primary Examiner* — Stanley K Hill
*Assistant Examiner* — Kalpana Bharadwaj
(74) *Attorney, Agent, or Firm* — Alin Corie; Sandy Swain; Micky Minhas

(57) ABSTRACT

The subject disclosure is directed towards the use of Monte Carlo (MC) procedures for computing the value of information (VOI), including with long evidential sequences. An MC-VOI algorithm is used to output a decision as to balancing the value and costs of collecting information in advance of taking action by running prediction model-based simulations to determine execution paths through possible states, and processing the results of the simulations/paths taken into a final decision.

17 Claims, 8 Drawing Sheets

US 9,367,815 B2

MONTE-CARLO APPROACH TO COMPUTING VALUE OF INFORMATION

BACKGROUND

Underlying a lot of intelligent behavior is the ability to balance the value and costs of collecting information in advance of taking an action or set of actions. Calculating the expected value of information (VOI) for sequences of observations under uncertainty is intractable, as branching trees of potential outcomes of sets of observations need to be considered in the general case. The task involves computing expectations over an exponentially growing tree of future evidence-gathering actions and outcomes Existing ways to use VOI approximations include making calculations of the value of a single "next" test to guide decision-making. These approximations to VOI do not work very well, as they rely on the assumption that only a single piece of evidence will be observed in advance of action, but are nevertheless used in sequential information-gathering settings. Is sum, real-world tasks can pose unsolvable problems with available methods for computing VOI to guide observations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards running simulations (Monte Carlo, or MC simulations) for computing the value of information (VOI), including with long evidential sequences. An MC-VOI algorithm performs (typically large) lookaheads using a sampling technique that can explore multiple observation and action outcome sequences with a single sample. Predictive models are used in the simulations.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using Monte Carlo procedures for computing VOI (value of information), including for long evidential sequence tasks. One exemplified procedure (algorithm) considers a partially observable Markov decision process (POMDP) in which domain actions are decoupled from observation gathering. The algorithm performs large lookaheads using a sampling technique that can explore multiple observation and action outcome sequences with a single sample, reducing the number of samples required to accurately estimate VOI.

It should be understood that any of the examples herein are non-limiting. Indeed, example problems that may benefit from MC-VOI technology are described herein, however numerous other problems may similarly benefit. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and making intelligent decisions in general.

Figure 1:
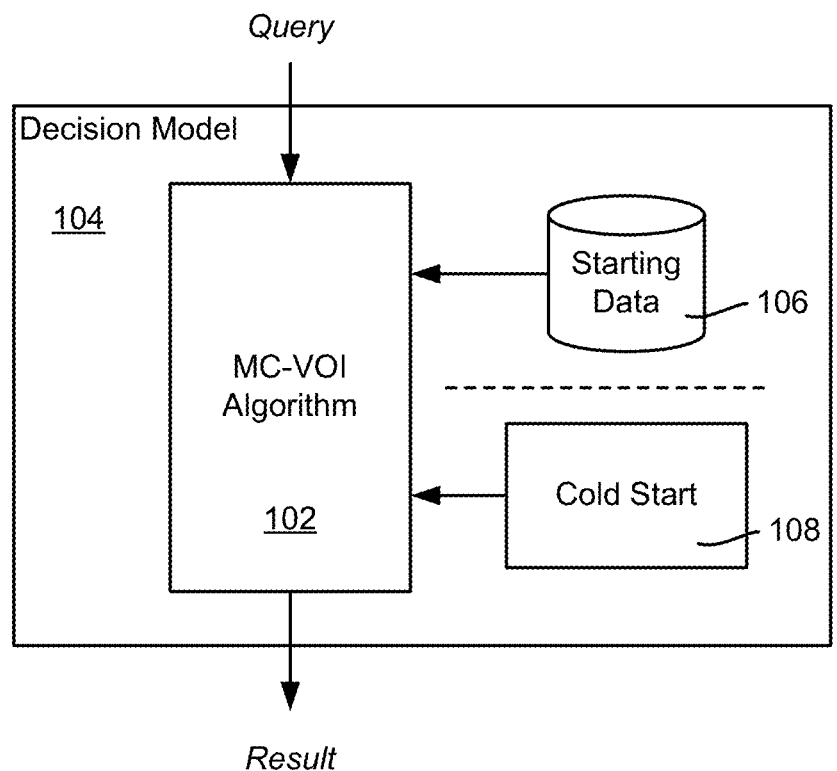
FIG. 1 is a block diagram including components configured to make a decision via an MC-VOI algorithm, according to one example embodiment.

FIG. 1 is a block diagram showing a general concept of how the MC-VOI algorithm 102 is used to make a decision in a decision model 104. In general, a query comes in, such as how many workers are to be hired to complete a crowdsourcing task, or whether hiring one more will provide any improvement to the result. The query may have limitations on it (e.g., do not hire more than one-hundred workers). As can be readily appreciated, a general goal is to save cost and thus hire as few workers as possible to achieve the desired result. Hiring too few workers will not obtain the desired result, while hiring too many will waste resources/unnecessarily increase the cost.

Described herein is MC-VOI which runs simulations in the form of samples through various paths/states in the form of a tree, but not all of the extremely large number of VOI paths for a long evidential sequence. Instead, the actual path taken by a simulation is tracked. The path taken varies based on predictions on future states. Models for making such predictions may be learned with machine learning based upon starting data. As described herein, the MC-VOI algorithm 102 in general provides a result based upon the paths taken. For example, by analyzing the states of the tree through which simulated answers reached the horizon, the number of workers to hire may be estimated such that hiring less may result in a bad classification, while hiring more will (likely) not change the outcome.

For some tasks, no starting data is available. Described below is a "cold start" mechanism 108 that adaptively handles such a situation. The cold start mechanism may employ an active learning approach to dynamically learn about domain dynamics (e.g., crowdsourcing tasks).

A long evidential sequence task represents the challenge of selecting a best domain action to take under uncertainty about the state of the world. A long evidential sequence task terminates when a domain action is taken, and is assigned a reward based on the action and the state of the world. Agents may delay their domain actions and invest time and effort to collect information that may enhance the expected values of their actions. With long evidential sequence tasks, agents work to come up with a policy for collecting sets of observations where pieces of evidence individually provide only small amounts of information about the true state of the world, amid the potential costs of delaying actions. Thus, agents need to balance the expected utility of collecting additional evidence with the overall cost of the observations.

Long evidential sequence tasks arise in a wide spectrum of arenas from medical diagnosis to agents providing people with advice. For example, it may be valuable for an agent to wait for new sets of weak evidence streaming in about traffic and to trade the value of the newly arriving information for the cost of delayed assistance to a driver. One example of long evidential sequence tasks used herein is directed towards a citizen science application that involves the acquisition of long sequences of votes from workers (e.g., the "crowd") about the correct answer of a classification task. To solve long evidential sequence tasks, an agent needs to reason about multiple dimensions of uncertainty. The state of the world is not fully observable, the state can stochastically change, and the agent has uncertainty about the observations it can collect.

Formally, a long evidential sequence (LES) planning task can be modeled as a finite-horizon POMDP [10], which is represented as a tuple $<S, A, T, R, \Omega, 0, l>$. S is a finite set of states of the world. $S_e \subset S$ is a set of terminal states. A is a finite set of actions. $A = D \cup \{c\}$, where $D = \{d_1, \ldots, d_n\}$ is the set of domain actions, and c is the evidence collection action. $T: S \times A \times S \rightarrow [0, 1]$ is the transition function. For any state $s \in S$, any $d \in D$ and any state $s' \in S \backslash S_e$, $T(s, d, s')$, the probability of transitioning to state s' from s by taking action d, is 0. $R: S \times A \rightarrow \mathbb{R}$ is the reward function. For any $d \in D$, $R(s, d)$, the reward for taking action d in state s, depends on the quality of domain action d in state s. $R(s, c)$ may correspond to a negative value that represents the cost for collecting additional evidence. $\Omega$ is a finite set of observations available in the domain, and $O: S \times A \times \Omega \rightarrow [0, 1]$ is the observation function. $O(s, a, o)$ represents the probability of observing o after taking action a in state s. l is the horizon of the decision-making task; for example, if the budget allows hiring only up to 100 workers, then 100 levels is the most allowed.

An agent solving a long evidential sequence task typically cannot directly observe the state of the world. The agent maintains a belief state, which is a probability distribution over world state S at each step. The agent has access to a belief update function which updates the belief state based on the observation received, the action taken, and the previous belief state. $\tau(b, a, b')$ represents the probability of transitioning to belief state b' after taking action a at belief state b. Long evidential sequence (LES) tasks terminate after a domain action is taken. Thus, for any belief state, the best domain action may be chosen by considering only immediate rewards. This characteristic enables decoupling decisions about whether to collect more evidence from decisions about the best domain action. The POMDP definition given above is mapped to a specialized belief MDP representation referred to as LES-MDP, though the same mapping can be achieved with a POMDP. An LES-MDP decouples observation and domain actions, and is represented by a tuple $<B, A', \tau', r, l>$, where B is the set of belief states over S; $A' = \{c, \neg c\}$ is a set of actions, where $\neg c$ is the action of terminating with $d^*(b)$, the optimal domain action given a belief state b:

$$d^*(b) = \operatorname*{argmax}_{d \in D} \sum_{s \in S} b(s) R(s, d)$$

$\tau'$, the belief state transition function, is:

$$\tau'(b, c, b') = \tau(b, c, b')$$

$$\tau'(b, \neg c, b') = \tau(b, d^*(b), b')$$

r, the reward function on belief states, is:

$$r(b, c) = \sum_{s \in S} b(s) R(s, c)$$

$$r(b, \neg c) = \sum_{s \in S} b(s) R(s, d^*(b))$$

A policy $\pi$ specifies whether it is beneficial for the system to take a domain action or to collect more evidence at any belief state. An optimal policy $\pi^*$ with value function $V^{\pi^*}$ satisfies the following equation:

$$V^{\pi^*}(b) = \max_{a \in A'} \left( r(b, a) + \sum_{b'} \tau'(b, a, b') V^{\pi^*}(b') \right)$$

For an LES task, the VOI computed for a belief state represents the expected utility associated with gathering additional evidence rather than taking an immediate domain action.

$$VOI(b)) = V^c(b) - V^{\neg c}(b)$$

$$= r(b, c) + \sum_{b'} \tau'(b, c, b') V^{\pi^*}(b') - r(b, \neg c)$$

VOI takes the immediate cost for collecting evidence into account. If VOI at a belief state is positive, it is beneficial to collect evidence at that state. Exact solution of LES-MDPs is intractable for long horizons, because the size of the search tree grows exponentially in the horizon.

Turning to a class of crowdsourcing referred to as consensus tasks, a consensus task involves the identification of a correct answer that is unknown to the task owner, and there exists populations of workers who can provide sets of weak evidence about the answer. Hiring a worker is associated with a cost. An automated system designed to assist with the solution of consensus tasks needs to make a decision, at any point in time, to hire a worker, or to terminate the task with a prediction about the correct answer based on reports collected so far. A goal is optimizing the expected utility of the system given utilities and costs for making correct or incorrect predictions, and costs for hiring workers.

An example consensus task described herein uses a citizen science project in which the crowd attempts to identify galaxies (e.g., Galaxy Zoo) given images. In each session, a worker is asked to classify galaxies into one of six possible galaxy classes (e.g., elliptical galaxy, spiral galaxy, and so forth). This provided a large dataset. Let L denote the set of galaxy classes. For a given galaxy, the system collects a vote from worker i, $v_i \in L$, about the correct classification of the task. In one system, after collecting as many votes as possible for a galaxy, the system identifies the correct answer (i.e., correct classification of a galaxy) as the answer that is agreed upon by at least eighty percent of the workers. If such a consensus is not reached after hiring a large number of workers, the correct answer is called undecidable. The set of decisions that can be taken by the system about the classification of a galaxy, D, is defined to be D=L∪{undecidable}.

A formal representation of a consensus task includes a number of predictive models, including a model for predicting the state of the world, a model for predicting future observations (worker votes), and a model for predicting how the state of the world changes. Such predictive models may be built from data via supervised learning.

Predictive models take as input a feature set f, which characterizes a task (e.g., visual features of a galaxy), and a history of observations $h_t = \langle v_1, \ldots, v_t \rangle$. Bayesian structure learning is performed to build probabilistic models from a training set, with the models evaluated on a test set. $M_{d*}$, the answer model, predicts the state of the world. $M_{d*}(d, f, h_t)$ is the probability of the correct answer being d given features and the history of worker votes collected from t workers. One such answer model has eighty percent accuracy when it has access to zero worker votes. Its accuracy improves until reaching accuracies up to ninety-eight percent when a large number of votes are available. $M_v$ refers to the vote model, which predicts future observations. $M_v(v_{t+1}, f, h_t)$ predicts the probability of the next vote being $v_{t+1}$ given task features and history of votes. One such model predicts the next vote with fifty-seven percent accuracy when no votes are available. It achieves a sixty-four percent accuracy after fifteen votes or more are collected.

In the dataset, the number of worker votes for each galaxy varies greatly. A task may terminate stochastically when there are no additional votes available for a galaxy. A probabilistic termination model is estimated from the training set, which represents the stochastic transitions of the state of the world. For simplicity this model may be excluded from the LES-MDP formalization given below; however evaluations may be performed on an updated LES-MDP model with transition and reward functions extended with the termination model.

Galaxy labeling tasks by the crowd may be modeled as an LES-MDP, represented by the tuple <B, A', τ', r, l>; l, the horizon of a task, is determined by the ratio of the maximum utility gained from a correct prediction to the cost of a worker. $b_t = \langle p_t, f, h_t \rangle$ is the belief state at time t, where $p_t$ is the system's belief about the correct answer as a probability distribution over possible answers of a task. The set of actions is A'={c, ¬c}. Once the system decides to terminate, the system's decision about the correct answer is computed as below, given that $U(d, d_c)$ is the utility for the system predicting the correct answer as d when the correct answer is $d^c$:

$$d^*(b_t) = \underset{d \in D}{\operatorname{argmax}} \sum_{d^c \in D} p_t(d^c) U(d, d^c)$$

τ', the belief state transition function, models the system's uncertainty about worker votes and the stochastic transitions about the world. When the system reaches the horizon or it takes action ¬ c, the system transitions deterministically to a terminal state. Otherwise the probability of system's belief transitioning from $b_t$ to $b_{t+1}$ is given below, where $b_t = \langle p_t, f, h_t \rangle$, $b_{t+1} = \langle p_{t+1}, f, h_{t+1} \rangle$, and for each d∈D, p'(d)=$M_{d*}$(d, f, $h_{t+1}$), $$\tau'(b_t, c, b_{t+1}) = \begin{cases} M_v(v_{t+1}, f, h_t) & \text{if } h_{t+1} = h_t \cup \{v_{t+1}\} \text{ and} \\ & p_{t+1} = p' \\ 0 & \text{otherwise} \end{cases}$$

r, the reward function on belief states, is defined below, where $\gamma_w$ is the cost for hiring a worker in belief state $b_t$:

$$r(b_t, c) = -\gamma_w$$
$$r(b_t, \neg c) = \sum_{d^c \in D} p_t(d^c) U(d^*(b_t), d^c)$$

Note that the galaxy identification domain highlights important challenges in solving real-world LES tasks. A galaxy identification task has forty-four votes on average, and may have up to ninety-three votes. Thus, the horizon of these tasks can be large, which makes exact solution approaches intractable. The answer model learned from the data is noisy when only a few votes are available, and becomes more accurate as more votes are collected. Consequently, there may be errors in the reward estimation of early belief states. Such errors may degrade the performance of traditional solution algorithms that evaluate the goodness of taking an action on a belief state based on the value of the reward function. An early belief state that is overly confident about a classification may mislead these algorithms to terminate prematurely.

In general, Monte-Carlo planning is a known approach for solving large planning problems. However, conventional/general Monte-Carlo planning algorithms hit a combinatorial challenge in exploring the long horizons typically associated with LES tasks. The number samples for exploring state, action outcomes grows exponentially in the horizon (a sample of a Monte-Carlo algorithm corresponds to a sequence of belief state, action outcomes from an initial belief state to a terminal belief state). These algorithms initially favor parts of the search space closer to the root, and thus need large numbers of samples to explore long horizons. Finally, the way that belief state, action outcomes are evaluated by these algorithms are susceptible to noise in belief estimation of LES tasks when few evidences have been observed.

In contrast, MC-VOI is a Monte-Carlo planning algorithm that uses the structure of LES tasks for addressing the drawbacks of existing algorithms for solving these tasks. MC-VOI explores the search space with sampling. Each sample corresponds to an execution path, which is a sequence of belief state, action outcomes that the system would encounter when it takes action c from an initial belief state to a terminal belief state. For each execution path, the algorithm evaluates the rewards associated with taking actions c and ¬ c for any belief state encountered on the path. The evaluation uses a state sampled at the terminal belief state when all available observations are collected. The algorithm builds a search tree based on execution paths sampled, and optimizes actions for each belief state on the tree. MC-VOI differs from existing Monte-Carlo planning algorithms in a number of ways, including that because a LES task terminates after taking a domain action, MC-VOI can evaluate the utility of any sequence of c and ¬ c action outcomes with a single sample. Doing so requires fewer number of samples to explore long horizons of LES tasks. Each sample of the algorithm traverses belief states from the root to the horizon, thus the algorithm can simultaneously explore belief states close to the root, as well as the ones close to the horizon. The algorithm evaluates all belief state, action outcomes based on a state sampled at the horizon when all available evidence is observed, thus utility estimates are less susceptible to noise in earlier belief updates.

Described herein is an MC-VOI algorithm for LES tasks for which the state of the world is static, e.g., such as a galaxy identification task in which the state of the world (i.e., the correct classification of a galaxy) does not change in time but the belief state changes in time as the system collects more worker reports and gets more confident about the correct answer. Also described herein is generalizing the MC-VOI algorithm for LES tasks where the ground truth of state is changing during evidence gathering.

With respect to MC-VOI for static tasks, one MC-VOI algorithm for LES tasks with static state is set forth as pseudocode in the following table:

```
CalculateVOI(b₀: belief state, l: horizon)
begin
|    repeat
|    |    SampleExecutionPath(b₀, l)
|    until Timeout
|    EVOI ← b₀ · Vᶜ − b₀ · V¬ᶜ
|    return EVOI
end
SampleExecutionPath(bₜ: belief state, l: horizon)
begin
|    if ¬IsTerminal(bₜ, l) then
|    |    bₜ₊₁ ← SampleNextBeliefState(bₜ)
|    |    s ← SampleExecutionPath(bₜ₊₁, l)
|    else
|    |    s ← SampleTrueState(bₜ)
|    end
|    Evaluate(bₜ, s, l)
|    return s
end
Evaluate(bₜ: belief state, s: state, l: horizon)
begin
|    bₜ · N¬ᶜ ← bₜ · N¬ᶜ + 1

|    bₜ · V¬ᶜ ← (bₜ · V¬ᶜ(bₜ · N¬ᶜ − 1) + R(s, d*(bₜ))) / (bₜ · N¬ᶜ)

|    if ¬IsTerminal(bₜ, l) then

|    |    bₜ · Nᶜ ← Σ_{b'ₜ₊₁∈Φ(bₜ)} b'ₜ₊₁ · N

|    |    bₜ · C ← (bₜ · C (bₜ · Nᶜ − 1) + R(s, c)) / (bₜ · Nᶜ)

|    |    bₜ · Vᶜ ← (Σ_{b'ₜ₊₁∈Φ(bₜ)} (b'ₜ₊₁ · V b'ₜ₊₁ · N)) / (bₜ · Nᶜ) − bₜ · C

|    end
|    if bₜ · V¬ᶜ ≥ bₜ · Vᶜ or bₜ · Nᶜ = 0 then
|    |    <bₜ · V, bₜ · N> ← <bₜ · V¬ᶜ, bₜ · N¬ᶜ>
|    else
|    |    <bₜ · V, bₜ · N> ← <bₜ · Vᶜ, bₜ · Nᶜ>
|    end
end
```

For a given LES-MDP and an initial belief state b0, the MC-VOI algorithm builds a partial search tree iteratively by calling the SampleExecution—Path function. As captured in the above pseudocode, each call to SampleExecutionPath samples one execution path, which includes a sequence of belief states that would be visited when the system continuously takes action c until reaching a terminal belief state. The algorithm grows the search tree by adding a new node when the SampleExecutionPath function samples a belief state that is not encountered before. For each encountered belief state $b_t$, the algorithm keeps four values; $b_t.C$ as the expected immediate cost for taking action c, $b_t.V^c$ as the expected value for taking action c, $b_t.V^{\neg c}$ as the expected value for taking action ¬ c, and $b_t.V$ as the expected value for taking the best of these actions. In addition, $b_t.N$ keeps count of the number of times $b_t$ is encountered. All these values are initialized to 0.

The SampleExecutionPath function samples an execution path by starting from the initial belief state ($b_0$) and sampling future belief states as it continuously collects more observations until reaching a terminal belief state. For a given belief state $b_t$, the likelihood of sampling $b_{t+1}$ as the next belief state is equal to $\tau'(b_t, c, b_{t+1})$. The SampleTrueState function is called at a terminal belief state to sample a state. At a terminal belief state $b_t$, the likelihood of SampleTrueState sampling any S∈S is $b_t(s)$. This sampled state is used by the Evaluate function to evaluate the rewards for taking actions c and ¬ c at any belief state on the execution path. The algorithm samples the state at a terminal belief state when all available evidence is collected and when belief estimation is most accurate. By doing so, the algorithm can evaluate the rewards of all belief states on an execution path consistently and can reduce the negative effects of noisy belief estimates at earlier states.

The Evaluate function updates the statistics of a belief state visited on an execution path based on the sampled state s. $b_t.V^{\neg c}$ is updated based on $R(s, d*(b_t))$, the immediate reward for taking the best domain action at s. $\Phi(b_t)$ represents the set of belief states that bt can transition to in the search tree after taking action c. $b_t.V^c$ is computed as the weighted average of the values of the belief states in $\Phi(b_t)$ minus $b_t.C$, the immediate cost for collecting more evidence. $b_t.V$ is computed as the maximum of $b_t.V^c$ and $b_t.V^{\neg c}$. After the algorithm samples many execution paths, each encountered belief state has an expected value for terminating and an expected value for collecting more evidence. The algorithm chooses the action to take at any belief state by calculating an expected value of information (EVOI) as the difference of the expected values for terminating and for collecting more evidence.

Figure 2A:
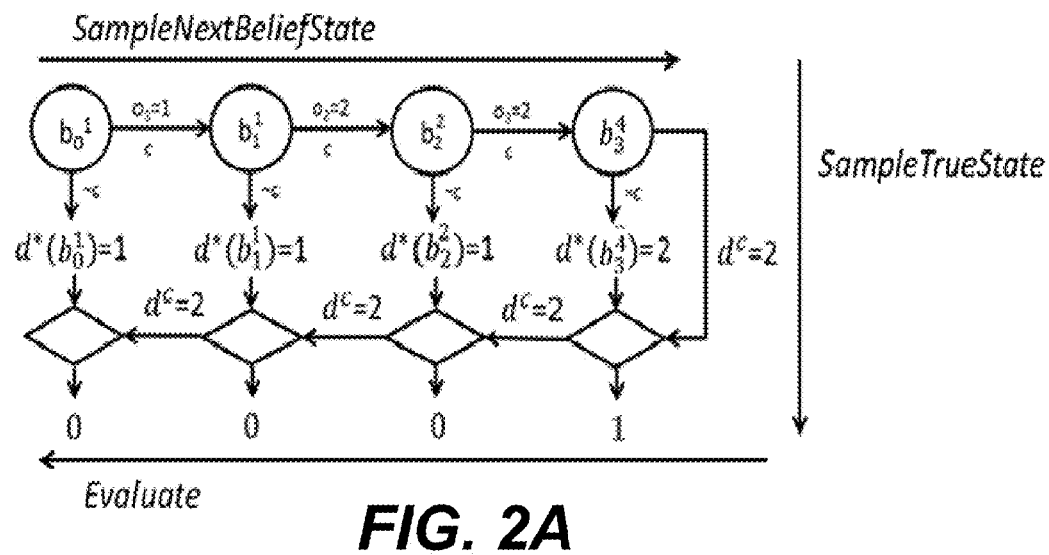
FIGS. 2A and 2B are a representations of how the MC-VOI algorithm runs samples through execution paths, according to one example embodiment.
Figure 2B:
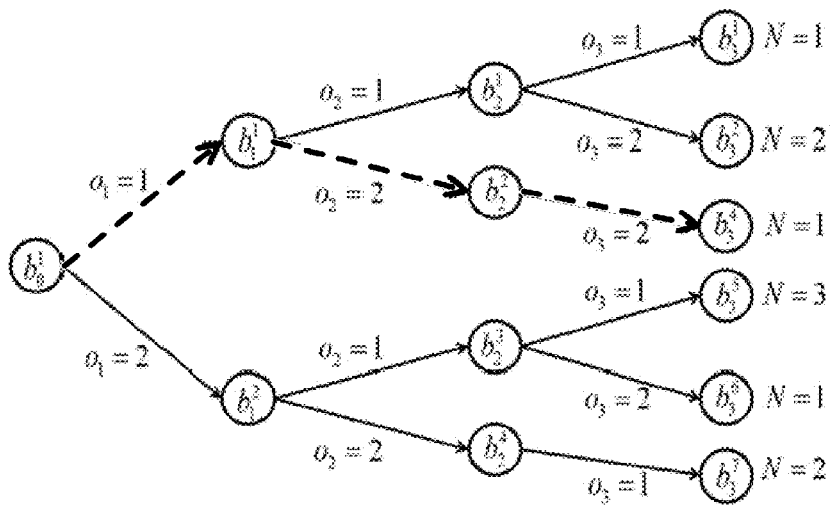

The workings of the algorithm are exemplified on a simple example given in FIGS. 2A and 2B. Consider a system that seeks observations from experts on the correct answer of a task, where there are two possible answers (D={1, 2}), two possible observations (votes) ($o_i$∈{1, 2}), and a horizon of 3. The reward for making the correct prediction is 1.0, and the cost of hiring an expert voter is 0.1. The initial belief state is $b_0^1$. The belief state $b_j^i$ is the ith belief state at depth j. $o_i$ is the observation obtained at time i. FIG. 2A displays a recursive call of the SampleExecutionPath function. The flow of the operations are represented with the directions of the arrows. When the algorithm reaches the terminal belief state $b_3^4$, the algorithm samples the state by sampling a value for the correct answer of the task. The correct answer $d^c$ is sampled as 2. Diamond shapes on the figure represent the calculation of an immediate reward for terminating at any belief state. When $d*(b_3^4)$, the prediction of the correct answer at belief state $b_3^4$, agrees with the value of the correct answer $d^c$, this belief state is rewarded 1 for terminating. All earlier belief states predict the value of $d^c$ incorrectly and receive reward 0. FIG. 2B demonstrates the partial search tree that is generated as a result of sampling ten execution paths. N values represent the number of times leaves are sampled. The execution path shown by the dashed represents the execution path given in FIG. 2A. Let $b_0^1.V^{\neg c}$ be 0.8, $b_1^1.V$ and $b_1^2.V$ be 0.8 and 1 respectively. $b_0^1.V^c$ is computed as 0.91 by taking the weighted average of $b_1^1.V$ and $b_1^2.V$ and subtracting the cost of a worker. VOI for belief state $b_0^1$ is 0.11 based on this partial tree.

The above is for static states. In dynamic LES tasks, there is no single static world state. Because the state may be changing while the system collects additional observations, the state sampled from a terminal belief state with the SampleTrueState function cannot be directly used to evaluate earlier belief states. Examples of such dynamic LES tasks include a robot tracking a moving target, or consensus tasks for which the cost of hiring a worker changes with respect to the market dynamics. One example algorithm, in the following table, expands MC-VOI for dynamic LES tasks with stochastic state transitions:

```
SampleExecutionPath(b_t:belief state, l:horizon)
begin
  | if¬ IsTerminal(b_t, l) then
  |   | b_{t+1} ← SampleNextBeliefState(b_t)
  |   | s_{t+1} ← SampleExecutionPath(b_{t+1}, l)
  |   | s_t ← SampleEarlierTrueState(b_t, s_{t+1})
  | else
  |   | s_t ← SampleTrueState(b_t)
  | end
  | Evaluate(b_t, s_t, l)
  | return s_t
end
```

The SampleEarlierTrueState function samples states for earlier belief states on an execution path in a manner consistent with the state sampled for the terminal belief state. This function uses the transition function T, which models the way the world state changes, to sample earlier belief states consistently. The function takes as input $s_{t+1}$, the sampled state for time t+1, and $b_t$, the system's belief state at time t, and samples $s_t$, a state for time t. Using Bayes rule, the likelihood of sampling $s_t$ is equal to:

$$Pr_e(S_t=s_t|S_{t+1}=s_{t+1}, B_t=b_t) \propto T(s_t,c,s_{t+1})b_t(s_t)$$

Figure 3:
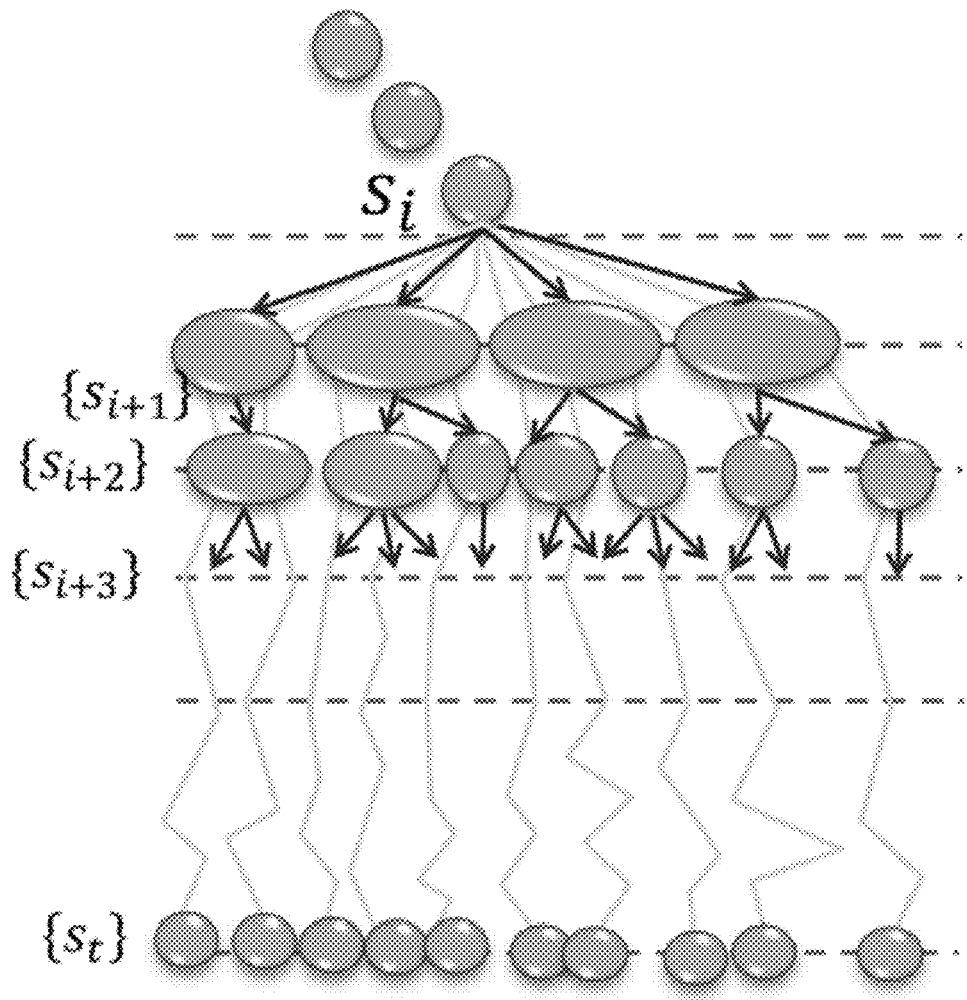
FIG. 3 is a representation of tracking data at states of the execution paths to determine a termination step, according to one example embodiment.

The convergence analysis for MC-VOI is based upon existing Monte-Carlo planning. The analysis is simplified as MC-VOI does not perform action selection. With each execution path sampled, MC-VOI updates the utility of taking any action on every belief state encountered on the path. Under the assumption of accurate belief states, observation, and transition functions, and in the limit of infinite samples, the tree generated by MC-VOI constitutes the complete search tree, and, by induction, the values assigned to each belief state and action pair are the true values that would be computed by an exact solution. MC-VOI's characteristics generalize to LES tasks that have multiple actions for collecting evidence. For example, a system for solving a consensus task may need to make decisions about which worker to hire, and which observations to gather. For such tasks, the action set includes action ¬ c, representing domain actions, and a set of evidence gathering actions. The algorithm can employ a known action selection to choose between evidence gathering actions to generate an execution path. Once an execution path is sampled, the algorithm can call the Evaluate function recursively to evaluate the utility of collecting more observations and the utility of taking a domain action simultaneously with a single sampled state Thus, the MC-VOI mechanism to estimate the value for hiring uses state structure, as represented in FIG. 3. While going through the tree, the system tracks which samples go through which states, ($P(s_k)$). For each state, the number ($N(s_k)$) of samples going through the state is kept. The value for terminating is computed as above.

However, to determine the value for hiring, the system goes from bottom up, using the state information:

$$V^H(s_k) = \frac{\sum_{s_k \to s_{k+1}} N(s_{k+1})V^*(s_{k+1})}{\sum_{s_k \to s_{k+1}} N(s_{k+1})}$$

$$V^*(s_k) = \max(V^H(s_k), V^{\neg H}(s_k))$$

LES tasks present challenges with long sequences of weak evidence and noisy belief state estimations that have not been addressed by studies of Monte-Carlo planning algorithms applied to fully observable domains. MC-VOI differs from existing algorithms in its leveraging of the special structure of LES tasks in both is exploration of the search space and the way it resolves uncertainty. It can evaluate the utility of any action outcome sequence on an execution path with a single sample, thus requires fewer number of samples to explore long horizons associated with LES tasks. The sampling procedure of MC-VOI needs a single sample to explore leaves close to the root as well as leaves close to the horizon. In contrast, the sampling procedures of existing Monte-Carlo algorithms initially favor leaves close to the root, requiring significantly larger samples to explore leaves close to the horizon, when the horizon is large. The way the state is sampled in MC-VOI leverages the situation where belief states closer to the horizon have less error, as these states will tend to incorporate a relatively large set of evidence. Because the algorithm samples the first true state at the end of the horizon based on all evidence collected, and evaluates earlier belief states accordingly, errors on the rewards of early belief states can be corrected. This procedure differs from the approach taken by existing algorithms, which sample a true state at the initial state and propagate it to future states.

Figure 4:
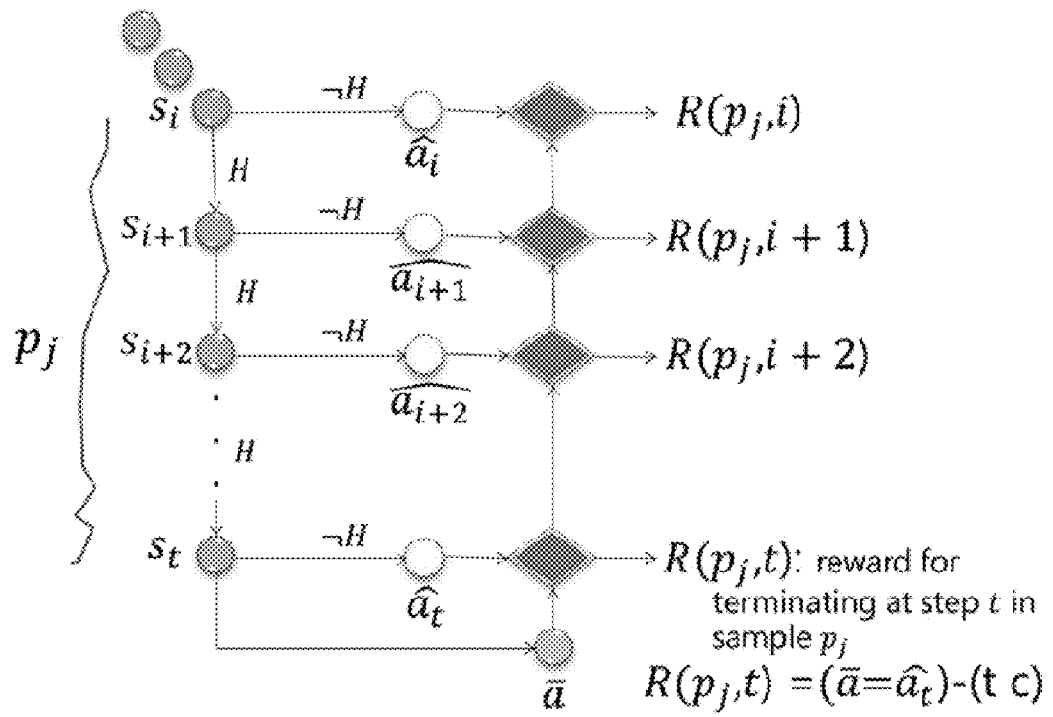
FIG. 4 is a representation of generating a sample, according to one example embodiment.

FIG. 4 is directed towards generating a single sample. This facilitates evaluating multiple action sequences with a single sample. Also, long horizons can be explored with a single sample. VOI is estimated by the algorithm by reasoning about multiple execution path samples created.

MC-VOI's VOI computation can be approximated with simple aggregation functions over samples, rather than constructing search trees as MC-VOI does. In general, the decision needs to estimate the value for hiring, $V^H(s_i)$ and terminating, $V^{\neg H}(s_i)$. For terminating, the reward may be averaged over the number of samples:

$$V^{\neg H}(s_k) = \sum_{p_j \in P(s_k)} \frac{R(p_j, k)}{\text{number of samples}}$$

Figure 5:
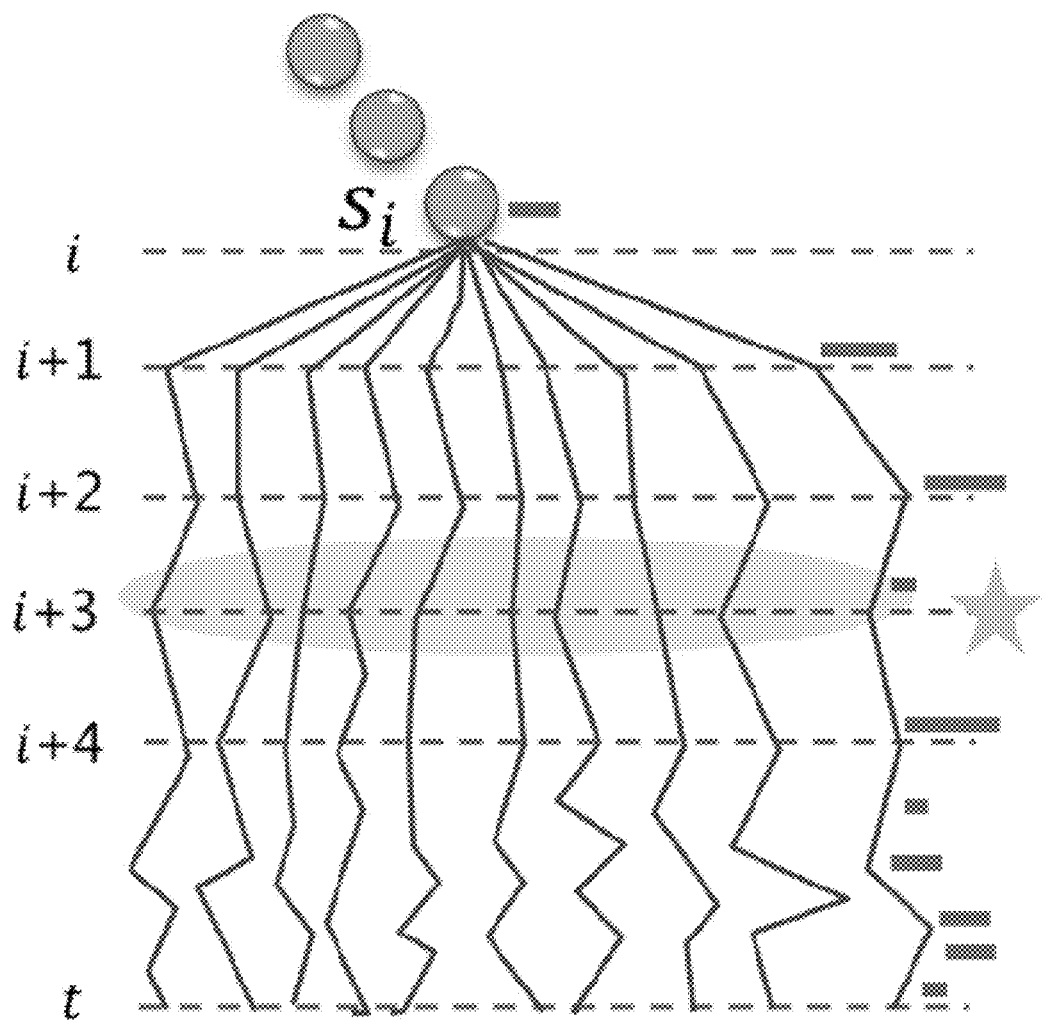
FIG. 5 is a representation of using lower bound sampling to determine a termination step, according to one example embodiment.

To estimate the value for hiring, $V^H(s_i)$, various approximations may be used. One approximate decision is based upon lower bound sampling, which finds the best step to terminate overall for all samples (as shown in FIG. 5):

$$V^H(s_i) = \max_{i < k \leq t} \sum_{p_j} R(p_j, i)$$

Figure 6:
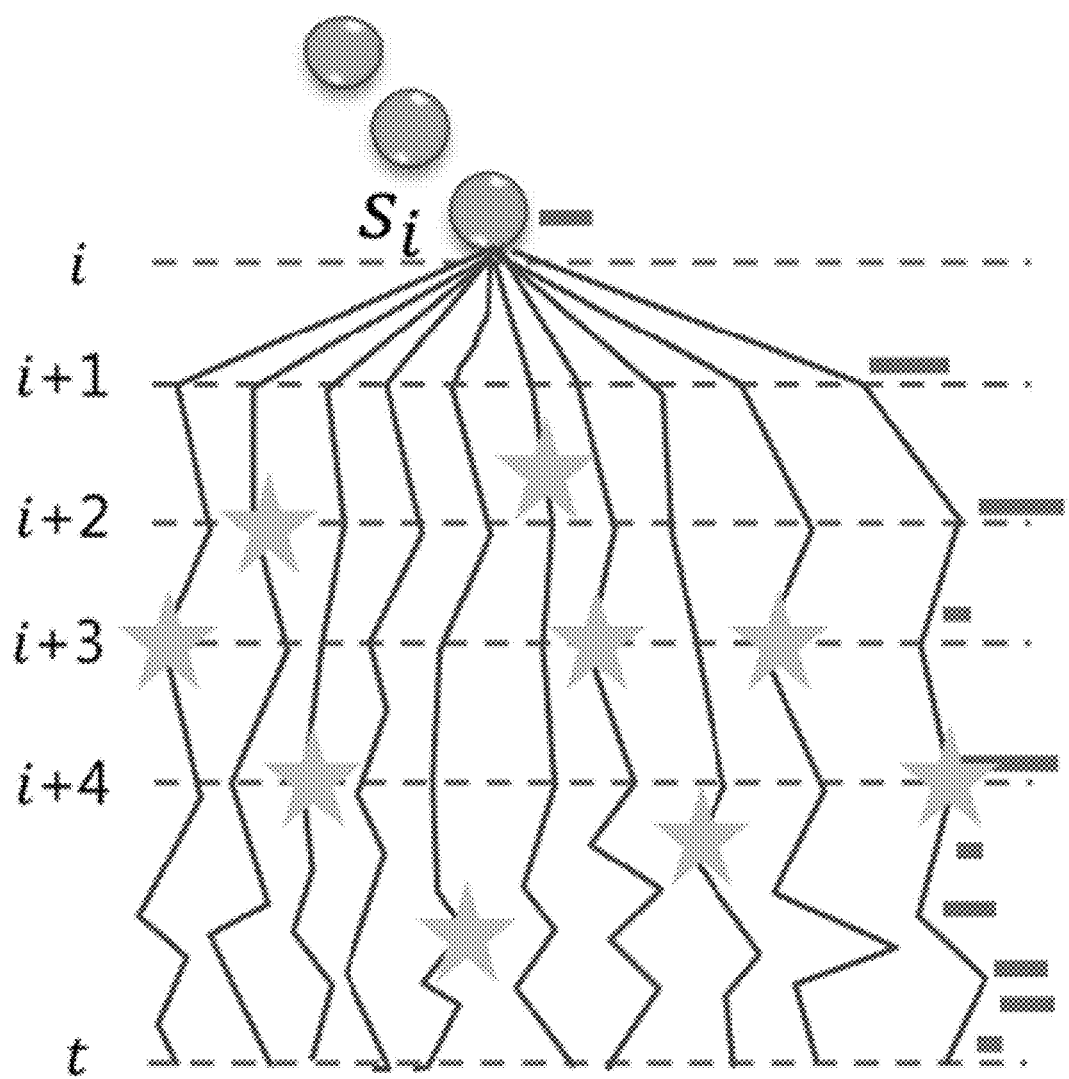
FIG. 6 is a representation of using upper bound sampling to determine a termination step, according to one example embodiment.

Another mechanism to estimate the value for hiring is an approximate decision based upon upper bound sampling, represented in FIG. 6, which finds the best step to terminate for each sample (represented by the star in each execution path):

$$V^H(s_i) = \sum_{p_j} \max_{i<k\leq t} R(p_j, i)$$

Note that these approximate algorithms calculate aggregate statistics over all samples to estimate the value for terminating. Lower bound sampling assumes a fixed strategy about when to terminate for all futures states, but decisions at future states may be different from each other. This leads to an underestimation of the termination value. Upper bound sampling picks the best termination point for each sample based on the sampled true state. In reality, the true state is unknown; this leads to an overestimation of the termination value.

Turning to another aspect, in one implementation, there are basically two versions of Monte-Carlo sampling, namely one when there is start data (as described above) and one when there is no start data (referred to as cold start). In both versions, predictive modeling is used to build models of domain dynamics and the system samples from these predictive models to generate paths. The start data version uses existing data to learn the models and uses these fixed models thereafter. The cold start version adaptively learns these models and keeps a distribution over possible models; the cold start version uses sampling to both sample predictive models and future transitions from the sampled predictive models.

With respect to cold start, namely the application of Monte-Carlo approaches for estimating VOI in settings where accurate models of the world do not exist, (e.g., using the cold start mechanism 108 of FIG. 1), adaptive control of consensus tasks are used as the illustrative example. Adaptive control of consensus tasks has a number of characteristics that distinguish it from other problems with inherent exploration-exploration tradeoffs. In solving consensus tasks, a system needs to make decisions without receiving continuous reinforcement about its performance. In contrast to the traditional problems in which any action help to explore the world, the exploration of a consensus task permanently terminates once ¬ H action is taken. As set forth above, in consensus tasks, the domains of answers and worker predictions are finite and known. The values for the horizon, utilities for correct identification of answers and for worker costs are quantified by task owners. However, both the priors on the correct answers of consensus tasks and the transition models are unknown, and need to be learned in time. Therefore, a successful adaptive control system needs to reason about its uncertainty about the specific model of the world as well as its uncertainty over the way a task may progress to make hiring decisions appropriately.

One adaptive control methodology is referred to as CrowdExplorer. CrowdExplorer is based on an online learning module for learning a set of probabilistic models representing the dynamics of the world (i.e. state transitions), and a decision-making module that optimizes hiring decisions by simultaneously reasoning about its uncertainty about its models and the way a task may stochastically progress in the world. One of the challenges is that the number of state transitions that define the dynamics of consensus tasks grows exponentially in the horizon. However, the next state of the system is completely determined by the vote of a next worker. Thus, the transition probabilities may be captured with a set of models that predict the vote of a next worker based on the current state of the task. This implicit representation of the world dynamics significantly reduces the number of variables to represent consensus tasks. Formally, state transitions may be modeled with a set of linear models $M=\{M_1, \ldots, M_{|L|}\}$, where $M_i$ predicts the likelihood of a next worker predicting the answer as $a_i \epsilon L$. Each model takes as input a set of features describing the current state, including the ratio of number of collected votes to the horizon, and for each vote class, the ratio of number of votes collected for that class to the total number of votes collected. Let $x_t$ denote k dimensional feature representation of state $s_t$ and each model $M_i$ is defined by k-dimensional vector of weights $w_i$, then transition probabilities may be estimated as below, where $s_{t+1}=s_t \cup \{o_{t+1}=a_i\}$.

$$T(s_t, H, s_{t+1}) = \frac{e^{w_i^T x_t}}{\sum_j e^{w_j^T x_t}}$$

The linear models are constantly updated using an online learning algorithm. Initially, the models are uninformative as they lack training instances. As workers provide votes, the system observes more data and consequently the models starts to provide useful transition probabilities. Because these models are latent, the parameters $w_i$ are represented as random variables. The online learning consequently is implemented as a Bayesian inference procedure using Expectation Propagation. More specifically, the inference procedure provides a Gaussian posterior distribution over the model parameters $w_i$. One of the benefits of the Bayesian treatment is that the variance of this posterior distribution captures the notion of uncertainty/confidence in determining the model. Intuitively, when there is no or very little data observed, the inference procedure usually returns a covariance matrix with large diagonal entries and corresponds to the high degree of difficulty in determining the model from a small amount of data. This uncertainty quickly diminishes as the system sees more training instances. Reasoning about such uncertainties enables the method to manage the tradeoff between exploration, learning better models by hiring more workers, and exploitation, selecting the best action based on its models of the world.

The backbone of the CrowdExplorer is the decision-making module. This module uses Monte-Carlo sampling of its distribution of predictive models to reason about its uncertainty about the domain dynamics, and uses the MC-VOI algorithm to calculate VOI based on its uncertainty about the domain dynamics and future states. Given the exponential search space of consensus tasks, Monte-Carlo planning as described herein is able to make decisions efficiently and accurately under these two distinct sources of uncertainty. The decision-making model is thus based on the above-described MC-VOI algorithm, which includes solving consensus tasks when perfect models of the world are known. MC-VOI samples future state, action transitions to explore the world dynamics.

Described herein is expanding the MC-VOI algorithm to reason about the model uncertainty that is inherent to adaptive control. Each call to the SampleExecutionPath function represents a single iteration (sampling) of the MC-VOI algorithm. Example details of the CrowdExplorer methodology is given in the following example algorithm:

```
begin
 | initialize Pr_M = {Pr_{M_1}, ..., Pr_{M_{|L|}}}
 | foreach task i do
 |  | s_t^i ← { }
 |  | repeat
 |  |  | VOI ← CalculateVOI(s_t^i, Pr_M)
 |  |  | if VOI > 0 then
```

```
            | | | | o_{t+1} ← GetNextWorkerVote
            | | | | AddLabel(Pr_M, o_{t+1})
            | | | | s_{t+1}^i ← s_t^i ∪ {o_{t+1}}
            | | | | s_t^i ← s_{t+1}^i
            | | | end
            | | | until VOI ≤ 0 or t = h
            | | output s_t^i.â
            | end
         end
         CalculateVOI(s_t:state, Pr_M:model distribution)
         begin
            | repeat
            | | {M̃_1, ..., M̃_|L|} ← SampleModels(Pr_M)
            | | SampleExecutionPath(s_t, {M̃_1, ..., M̃_|L|}, h)
            | until Timeout
            | return VOI ← s_t.V^H - s_t.V^{¬H}
         end
```

For any state $s_t^i$ of a consensus task i, the methodology uses sampling to estimate values of states for taking different actions as an expectation over possible models and stochastic transitions. At each iteration, the methodology first samples a set of models $(\tilde{M}_1, \ldots, \tilde{M}_{|L|})$ from the model distribution $Pr_M$. These sampled models are provided to MC-VOI to sample future state transitions from $s_t^i$ by continuously taking action H until reaching the horizon. The resulting state transitions form an execution path. Each execution path represents one particular way a consensus task may progress if the system hires workers until reaching the horizon. The aggregation of execution paths forms a partial search tree over possible states. The tree represents both the uncertainty over the models and over future transitions.

Figure 7A:
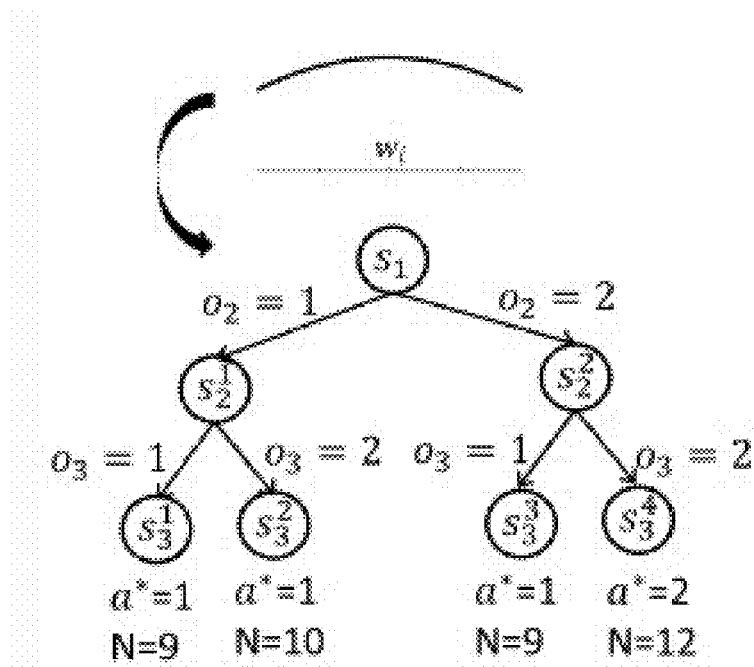
FIGS. 7A and 7B are representations of search trees generated with high and low uncertainty over models, respectively, according to one example embodiment.
Figure 7B:
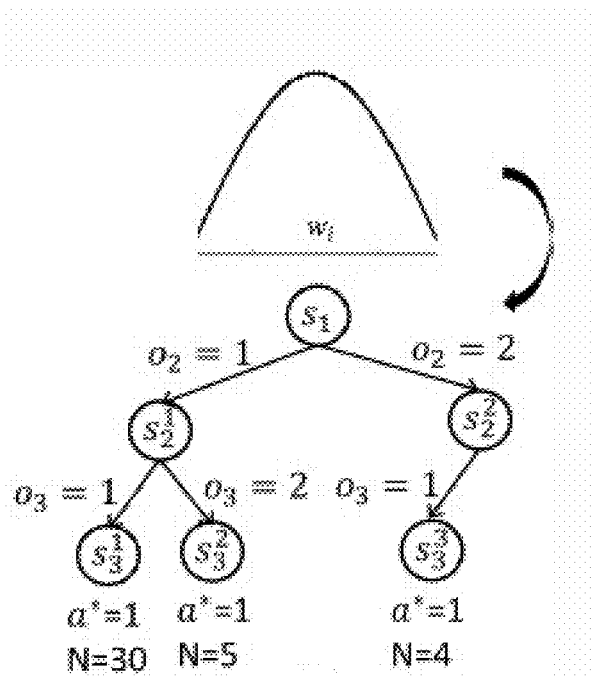

FIGS. 7A and 7B show search trees generated by CrowdExplorer when there is high uncertainty (FIG. 7A) and low uncertainty over models (FIG. 7B).

For each state $s_t$ on the partial search tree, the methodology uses recursive search on the tree to estimate values for hiring a worker $(s_t.V^H)$ and for terminating $(s_t.V^{¬H})$, and to predict the most likely answer for that state $(s_t.\hat{a})$ (as shown in the next algorithm). It decides to hire a worker if VOI for the initial state is estimated to be positive. Once the vote of the next worker arrives, the vote is used to update the predictive models and update the state of the task. This computation is repeated for future states until the budget is consumed or VOI is estimated to be non-positive. The methodology terminates the task by delivering the predicted answer (a) and moves on to the next task.

The variance of the predictive models estimated dynamically by the online learning algorithm guides the decision making algorithm in controlling the exploitation-exploration tradeoff. When the variance is high, each sampled model provides a different belief about the way future workers will vote. Execution paths reflecting these diverse beliefs lead to high uncertainty about the consensus answer that will be received at the horizon. Consequently, this leads to more exploration by hiring workers. When the variance is low, sampled models converge to a single model. In this case, the hiring decisions are guided by exploiting the model and selecting the action with the highest expected utility. This behavior is illustrated in FIGS. 7A and 7B for a simplified example, in which $o_i \in \{0, 1\}$, h=3 and majority rule is the consensus rule. FIGS. 7A and 7B display the partial search trees generated for initial state $s_1=\{o_1=1\}$ when there is high uncertainty and low uncertainty over the models, respectively. In FIG. 7A, high uncertainty over the models leads to high uncertainty over the correct answer and VOI is estimated to be high. In FIG. 7B, sampled models agree that future workers are likely to vote 1. As a result, execution paths where workers vote 1 are sampled more frequently. The correct answer is predicted to be 1 and VOI is estimated to be not positive.

The approach uses the sampling methodology of the MC-VOI algorithm for sampling an execution path (p) for a given sampled model ($\tilde{M}$). The code for sampling an execution path is given below:

```
SampleExecutionPath(s_t: state, M̃: set of models, h: horizon)
begin
   | if t = h then
   | | a_p^* ← ConsensusRule(s_t)
   | else
   | | o_{t+1} ← SampleNextVote(s_t, M̃)
   | | s_{t+1} ← s_t ∪ {o_{t+1}}
   | | a_p^* ← SampleExecutionPath(s_{t+1}, M̃, h)
   | end
   | s_t.N[a_p^*] ← s_t.N[a_p^*] + 1
   | s_t.N ← s_t.N + 1

| s_t.V^{¬H} ← (max_{a∈A} s_t.N[a] / s_t.N × u) - (t × c)

| if t < h then
   | | s_t.V^H ← (Σ_{s'_{t+1}∈Φ(s_t)} (s'_{t+1}.V × s'_{t+1}.N)) / s_t.N
   | end
   | s_t.V ← max(s_t.V^{¬H}, s_t.V^H)
   | s_t.â ← argmax_{a∈A} s_t.N[a]
   | return a_p^*
end
```

The algorithm generates execution paths by recursively sampling future votes from the predictive models until reaching the horizon as described above. At the horizon, it uses the consensus rule to determine the correct answer corresponding to the path $(a_p^*)$. For each path, the algorithm uses $a_p^*$ to evaluate the utilities of each state on the path for taking actions H and ¬ H by taking into account c, the cost of worker.

For each state $s_t$ visited on a path, the algorithm keeps the following values: $s_t.N$ as the number of times $s_t$ is sampled, $s_t.N[a]$ as the number of times a path visited $s_t$ reached answer a, $s_t.N[a]/s_t.N$ as the likelihood at $s_t$ for the correct answer being a, $s_t.\hat{a}$ as the predicted answer at $s_t$. $s_t.V^{¬H}$, the value for terminating, is estimated based on the likelihood of predicting the answer correctly at that state. $\Phi(s_t)$ is the set of states reachable from $s_t$ after taking action H. $s_t.V^H$, the value for hiring more workers, is calculated as the weighted average of the values of future states accessible from $s_t$.

Example Operating Environment

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices.

Those skilled in the art will appreciate that computer systems have a variety of configurations and protocols that can be used to communicate data, and thus, no particular configuration or protocol is considered limiting.

Figure 8:
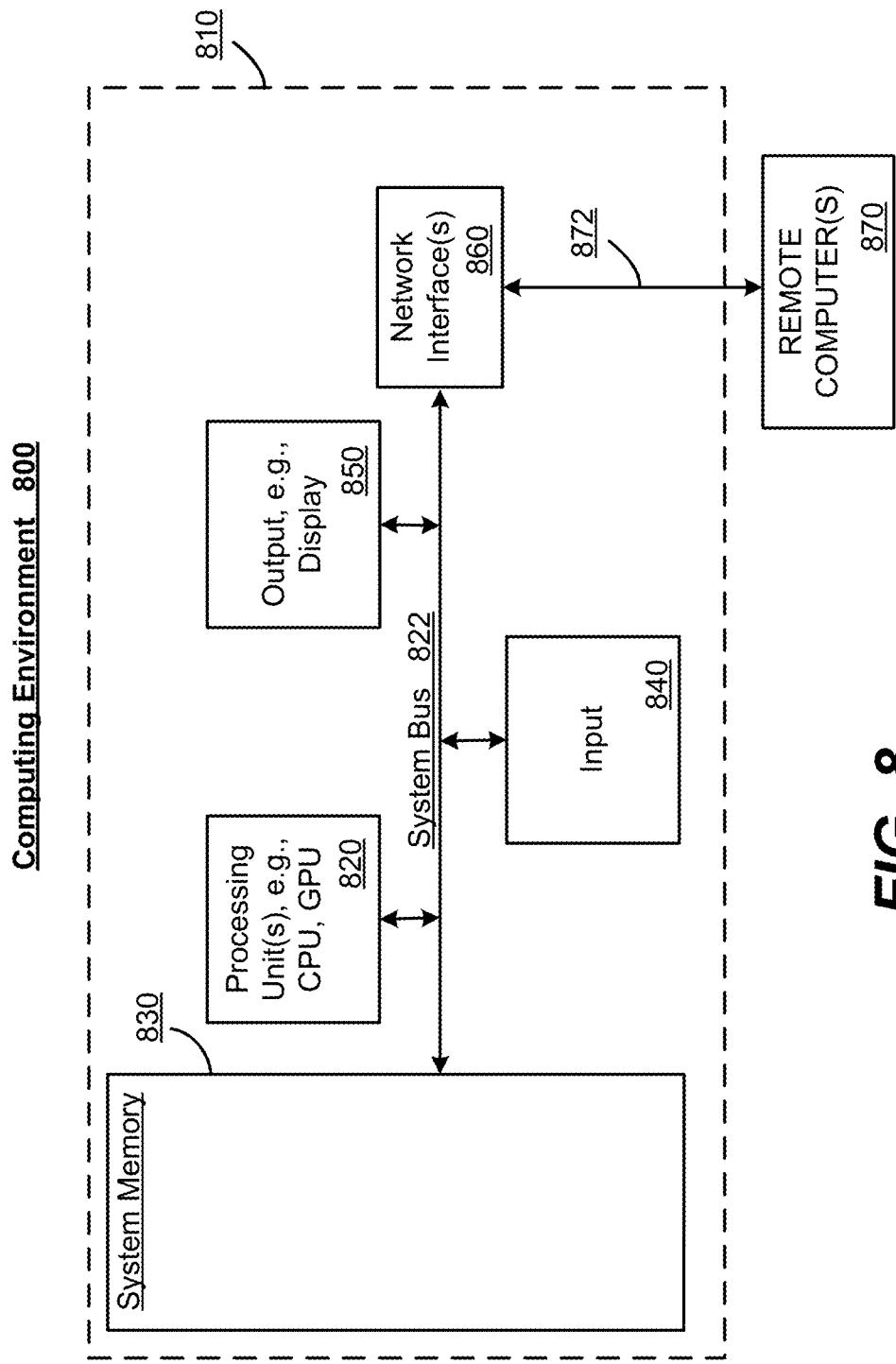
FIG. 8 is a block diagram representing an example computing environment, into which aspects of the subject matter described herein may be incorporated.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:
   receiving a request to calculate a value of information for a long evidential sequence task, the long evidential sequence task comprising a plurality of belief states that formulate paths, a sample being an execution of a path to completion, wherein a belief state has a particular action associated therewith, the particular action being taken as the belief state is traversed;
   assuming the plurality of belief states are accurate, executing a first sample through a first path by traversing all beliefs states in the first path; and
   calculating the value of information for the long evidential sequence task based on an outcome of the executed first sample.

2. The method of claim 1, further comprising using predictive modeling to build models of domain dynamics, and sampling from predictive models to generate the execution paths.

3. The method of claim 2, further comprising processing existing start data to learn the predictive models and using fixed models thereafter.

4. The method of claim 2, further comprising:
   adaptively learning the predictive models where starting data is unavailable; and
   keeping a distribution over possible predictive models.

5. The method of claim 4, further comprising using sampling to both sample the predictive models and future transitions from the sampled predictive models.

6. The method of claim 1, wherein the expected value of information is a difference of an expected value for terminating and an expected value for collecting more evidence for estimating the value of information.

7. The method of claim 1, wherein the request comprises a plurality of thresholds to consider when estimating the value of information.

8. A method comprising:
   receiving a request to calculate an expected value of information for a long evidential sequence task, the long evidential sequence task comprising a plurality of belief states that formulate paths, the plurality of belief states comprising a first belief state and a terminal belief state, a sample being an execution of a path until an action associated with the terminal belief state is executed;
   building a search tree by executing a plurality of samples through corresponding paths;
   identifying values for all traversed belief states, the value representing one or more of the following: an expected cost for taking an action associated with a corresponding belief state, an expected value for taking the action associated with the corresponding belief state, and an expected value for taking a terminating action associated with the corresponding belief state;
   calculating the expected value of information based on the identified values for all of the traversed belief states; and
   using the plurality of executed samples to evaluate a reward for taking an action at any of the plurality of belief states.

9. The method of claim 8, wherein building the search tree further comprises sampling a distribution of belief states.

10. The method of claim 8, further comprising using the plurality of executed samples to evaluate a reward for taking a separate action at any of the plurality of belief states.

11. A system for implementing Monte Carlo process for computing a value of information for a long evidential sequence task, the system comprising:
    a processor; and
    a memory area having logic stored therein executable by the processor to:
       receive a request to for to compute the value of information for the long evidential sequence task, the long evidential sequence task comprising a plurality of belief states that formulate execution paths, a sample being an execution of a path until an action associated with a terminal belief state is executed;
       executing a plurality of samples through corresponding paths by traversing all beliefs states in the corresponding paths; and
       calculating the value of information for the long evidential sequence task based on an outcome of the executed plurality of samples,
    wherein the logic stored therein is further executable by the processor to update statistical values and counts of belief states encountered during sampling upon the execution of the plurality of samples.

12. The system of claim 11, wherein the expected value of information is calculated as the difference of an expected value for a first action and an expected value for a second action, wherein the first action is collecting more evidence and the second action is the terminating action.

13. The system of claim 11, wherein the logic stored therein is further executable by the processor to build a search tree based on the execution of the plurality of samples.

14. The system of claim 11, wherein the logic stored therein is further executable by the processor to use predictive modeling to build models of domain dynamics, and sample from predictive models to generate the execution paths.

15. The system of claim 14, wherein the logic stored therein is further executable by the processor to process existing start data to learn the predictive models and using fixed models thereafter.

16. The system of claim 14, wherein the logic stored therein is further executable by the processor to adaptively learn the predictive models where starting data is unavailable and keeping a distribution over possible predictive models.

17. The system of claim 11, wherein the request comprises a plurality of thresholds to consider when computing the value of information.

* * * * *